(12) United States Patent
Rhone et al.

(10) Patent No.: US 6,513,545 B2
(45) Date of Patent: Feb. 4, 2003

(54) SAFETY VALVE WITH ADJUSTABLE MAXIMUM FLOW SHUT OFF MECHANISM

(76) Inventors: Evan M. Rhone, 22082 Inkster Rd., Southfield, MI (US) 48034; John G. Elkins, 3400 Wells Rd., Petersburg, MI (US) 49270; Reggie T. Dixon, 218 Vernon St., Pontiac, MI (US) 48342

(*) Notice: Subject to any disclaimer, the term of this patent is extended or adjusted under 35 U.S.C. 154(b) by 0 days.

(21) Appl. No.: 09/761,389

(22) Filed: Jan. 16, 2001

(65) Prior Publication Data

US 2002/0092566 A1 Jul. 18, 2002

(51) Int. Cl.[7] .............................................. F16K 17/30
(52) U.S. Cl. ........................ 137/529; 137/517; 137/540; 137/460; 251/337
(58) Field of Search ................................ 137/517, 529, 137/540, 460, 498; 251/337

(56) References Cited

U.S. PATENT DOCUMENTS 3,336,942 A * 8/1967 Keith et al. .................. 137/529
3,489,172 A * 1/1970 Whitmore .................... 137/529

(List continued on next page.)

FOREIGN PATENT DOCUMENTS

SU 0945556 * 7/1982

OTHER PUBLICATIONS

2000 Source Book for E&S Industrial Sales; Supplies and Solutions for Industry.

*Primary Examiner*—Michael Powell Buiz
*Assistant Examiner*—Ramesh Krishnamurthy

(74) *Attorney, Agent, or Firm*—Gifford, Krass, Groh, Sprinkle, Anderson & Citkowski, P.C.

(57) ABSTRACT

A flow shut off valve for use with a pressurized fluid application and which is actuated in response to a flow rate exceeding a maximum allowable rating, the fluid application including a normally regulated and pressurized fluid supply, a length of a conduit extending from the fluid supply. The valve includes an elongated and substantially cylindrical shaped housing interposed between the fluid supply and the extending conduit, the housing having an inlet end communicating with a first coupling extending from an outlet of the fluid supply and an outlet end communicating with a second coupling extending from an inlet of the length of conduit. The housing further including an axially extending interior extending between the inlet and outlet ends. A seating member is slidably mounted within the axially extending interior and translatable over a selected distance defining an open position permitting fluid flow through the interior and a closed position in which the seating member abuts against the annular shoulder, substantially interrupting said fluid flow. A first biasing spring exerts against an inlet side of the seating member and a second adjustable biasing spring exerts against an outlet side of the seating member, the second spring equalizes a combined force provided by the first spring and the normally regulated fluid supply in the open position. Upon the fluid application switching from a normally regulated condition to an opened and unregulated condition, the combined force acting upon the seating member overcomes the counter force exerted by the second biasing spring and actuates the seating member to the closed position.

9 Claims, 2 Drawing Sheets

U.S. PATENT DOCUMENTS

| | | | |
|---|---|---|---|
| 3,510,099 A | | 5/1970 | Crump |
| 3,605,793 A | | 9/1971 | Kinsel |
| 3,756,270 A | * | 9/1973 | Fonseca et al. ............. 137/480 |
| 3,786,828 A | | 1/1974 | Krechel |
| 4,049,017 A | * | 9/1977 | Jones ......................... 137/540 |
| 4,074,695 A | | 2/1978 | Weirich et al. |
| 4,182,354 A | | 1/1980 | Bergstedt |
| 4,252,145 A | | 2/1981 | Peters |
| 4,643,228 A | | 2/1987 | Spencer |
| 4,706,705 A | | 11/1987 | Lee, II |
| 4,809,740 A | * | 3/1989 | Nevlud ...................... 137/498 |
| 4,811,756 A | * | 3/1989 | Hall ........................... 137/498 |
| 4,813,492 A | | 3/1989 | Biek |
| 4,930,553 A | | 6/1990 | Grillo |
| 5,170,818 A | | 12/1992 | Hatzikazakis |
| 5,285,813 A | * | 2/1994 | Quante et al. .............. 137/494 |
| 5,462,081 A | * | 10/1995 | Perusek et al. ............. 137/498 |
| 5,501,242 A | | 3/1996 | Coutts et al. |
| 5,560,343 A | | 10/1996 | Werkmann et al. |
| 5,623,962 A | | 4/1997 | Danzy et al. |
| 5,769,115 A | | 6/1998 | Ohsaki et al. |
| 5,860,446 A | | 1/1999 | Hunt |
| 6,032,922 A | | 3/2000 | Shew |
| 6,056,277 A | | 5/2000 | Wode |
| 6,099,264 A | | 8/2000 | Du |
| 6,189,562 B1 | * | 2/2001 | Lorentz ...................... 137/469 |

* cited by examiner

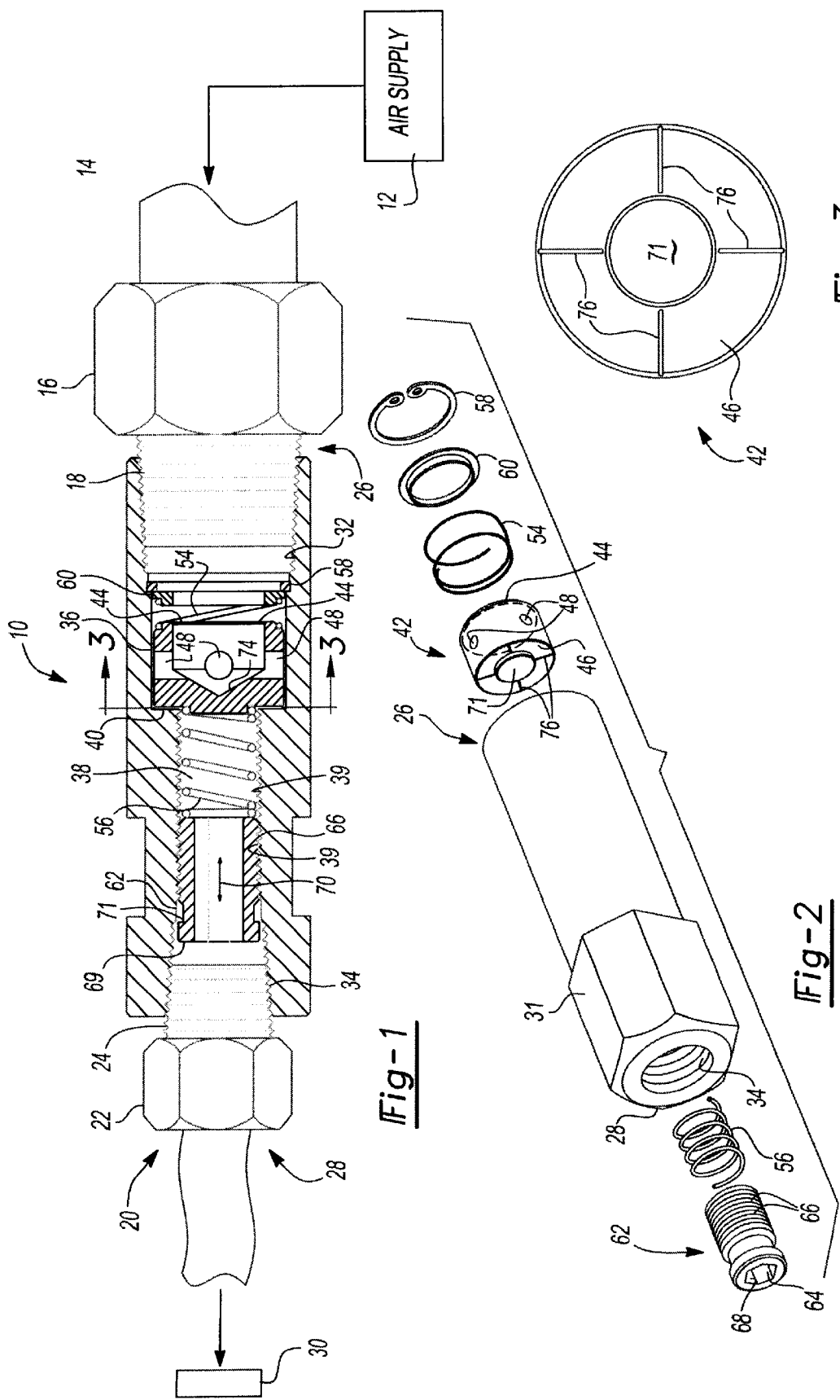

SAFETY VALVE WITH ADJUSTABLE MAXIMUM FLOW SHUT OFF MECHANISM

BACKGROUND OF THE INVENTION

1. Field of the Invention

The present invention relates generally to safety valve devices for use in high-pressure fluid applications. More particularly, the present invention is directed to an adjustable safety valve assembly incorporated into high-pressure and high-flow pneumatic and hydraulic fluid lines and which, upon experiencing an unregulated and excessive air flow through the line, causes a spring-biased bearing member within the valve to actuate to a closed/interrupted position.

2. Description of the Prior Art

Air flow and fluid flow shut off valve assemblies are fairly well know in the art. The purpose for such safety valves is typically to automatically shut off the air flow within the fluid line upon a predetermined air pressure being achieved, typically caused by a break or failure in the regulating equipment associated with the air compressor or air delivery source.

A first example of such an air pressure relief valve is illustrated in U.S. Pat. No. 5,623,962, issued to Danzy et al., and which includes a body with first and second openings for connection in an air line and an interior wall defining a flow-through passageway extending from a first opening to a second opening. A chamber with an inlet port and an outlet provides fluid communication between the chamber and the passageway. A guide is removably secured to the body and defines a bore extending into the chamber. The guide is spring-loaded and an adjustment screw is threadably secured to the open-ended portion of the guide and bears against the spring for adjusting the compression of the spring and, accordingly, the set pressure of the valve.

A further example of an air spring arrangement is disclosed in U.S. Pat. No. 6,056,277, issued to Wode, which teaches an air spring arrangement for a valve and in which a cylinder includes a chamber in which is mounted an axially movable and hollow piston. In an open position of the hollow piston, the valve clears the connecting line. In a closed position of the piston, the connecting line is blocked.

U.S. Pat. No. 4,930,553, issued to Grillo, discloses a further variation of a pressure relief valve having a poppet member biased toward and sealingly engaging a slidable tubular valve seat having unrestrained axial rotation and a central relief flow passage. When the system pressure reaches a threshold pressure the valve seat and poppet are both axially displaced such that at the moment the poppet is unseated from the valve seat, the valve seat is in motion. The motion of the valve seat when the poppet is unseating or reseating allows the valve seat to comply with any eccentricities of the poppet to achieve uniform seat stresses and low leakage rates as well as acceptable flow rates and low hysteresis.

U.S. Pat. No. 4,706,705, issued to Lee, II, discloses a miniaturized check valve having a generally tubular body including a cylindrical base and a guide sleeve of reduced diameter which axially extends from the base. The body forms an interior valve seat which surrounds an axially extending fluid passageway. The guide sleeve has a plurality of angularly spaced discharge openings and a pair of pilot orifices which are axially spaced from the valve seat. A valve ball is displaced from the valve seat to form a fluid flow path which extends generally axially through the valve seat and into the guide sleeve and thereafter generally radially through the orifices and openings for flow exteriorly of the guide sleeve. The ball is biased by a spring assembly which comprises a pair of axially aligned springs having a relatively low preload force and. low spring rate.

Finally, the Industrial Sales 2000 Source Book catalog discloses a pneumatic check valve (SV802, SV803 and SV804) produced by Coilhouse Pneumatics. The Coilhouse check valve is incorporated into a high pressure fluid line and includes a substantially tubular outer body having a first openable end with a threadably engageable cap (inlet end) and a second substantially narrowed end defined by annular shaped end wall with an interiorly threaded aperture defined therethrough (outlet end). The engageable cap also includes an interiorly threaded aperture which, in combination with the likewise threaded aperture at the outlet end, provides for a pressurized air input hose and an output hose to be attached to the check valve.

The shut off assembly within the Coilhouse check valve is provided by a nylon constructed seating member which is generally cylindrical in shape and axially recessed on its inlet side. A single coil spring exerts a biasing force on the outlet side and biases the seating member in a direction towards the inlet side. Upon experiencing a determined degree of pressurized air flow, the seating member is actuated in a direction against the spring, towards the outlet side of the valve housing, and shuts off the air flow upon the seating member shouldering against an associated and abutting interior end wall of the valve housing.

SUMMARY OF THE PRESENT INVENTION

The present invention is a flow shut off valve for use with a pressurized fluid application and which acts to substantially shut off the fluid flow upon the occurrence of an opened and unregulated fluid flow and which exceeds a maximum flow rating permitted by the valve. The shut off valve of the present invention is further a significant improvement over the prior art in that it is particularly directed to actuating in response to a determined fluid flow (typically measured in cubic feet per minute "CFM") rather than a determined fluid pressure (pounds per square inch "PSI"). It has been found that large and unregulated fluid flow output, even in the absence of significantly high pressure, can still pose significant danger to both users and other individuals in proximity to the fluid application and for which a suitably constructed shut off valve is required.

The shut off valve includes a substantially cylindrical housing interposed between a fluid supply outlet and an inlet of a flexible and elongated conduit. Typically secured to an opposite end of the conduit is any conventional type of fluid (air or hydraulic) powered tool.

The housing defines an axially extending interior communicating the fluid supply and conduit and which. The extending interior includes, at an intermediate location, an annular shoulder which separates an enlarged diameter portion with a narrowed diameter portion.

A seating member is slidably mounted within the enlarged diameter portion and is axially translatable over a selected distance defining an open position permitting fluid flow through the interior and a closed position in which the seating member abuts against the annular shoulder and substantially interrupts the fluid flow. The seating member further includes a substantially cylindrical shaped body with a substantially centrally disposed aperture facing an inlet end of the valve housing. A plurality of additional apertures are defined in annular spaced fashion around a circumference of the cylindrical shaped body and communicate the inlet end and an outlet end of the valve housing. The seating member further includes a closed end face at the outlet end.

A first spring is contained within the housing and exerts against an inlet side of the seating member. A second spring is likewise provided and exerts against an outlet side. The second spring is adjustable in its intensity through the provision of an insert sleeve threadably engaged within the narrowed diameter portion of the valve housing and which acts against an associated and abutting end of the second spring.

The force exerted by the second spring equalizes a combined force provided by the first spring and the normally regulated fluid supply in the open position. Upon the fluid application switching from a normally regulated condition to an opened and unregulated condition, the combined force acting upon the seating member overcomes the biasing force of the second spring and actuates the seating member to the closed position.

An additional advantage of the flow shut off valve includes a plurality of radially extending notches defined within an exterior surface of the closed end face of the seating member for maintaining the conduit in an inflated position upon said seating member actuating to the closed position and by permitting a reduced volume of fluid flow across the inlet side, through through notches, across the outlet side, and into the extending conduit. The ability to maintain the conduit in a semi-inflated position allows for quicker return time to the given pressurized fluid application and once the fluid supply returns to the regulated position and the valve reseats to the open position.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is cutaway view of the flow shut off valve according to the present invention;

FIG. 2 is an exploded view of the valve shown in FIG. 1;

FIG. 3 is a cutaway view taken along line 3—3 of FIG. 1 and further illustrating the radially extending notches defined within the end face of the seating member for maintaining pressurization of the attached conduit in the closed/interrupted position;

DETAILED DESCRIPTION OF THE PREFERRED EMBODIMENTS

Figure 4:
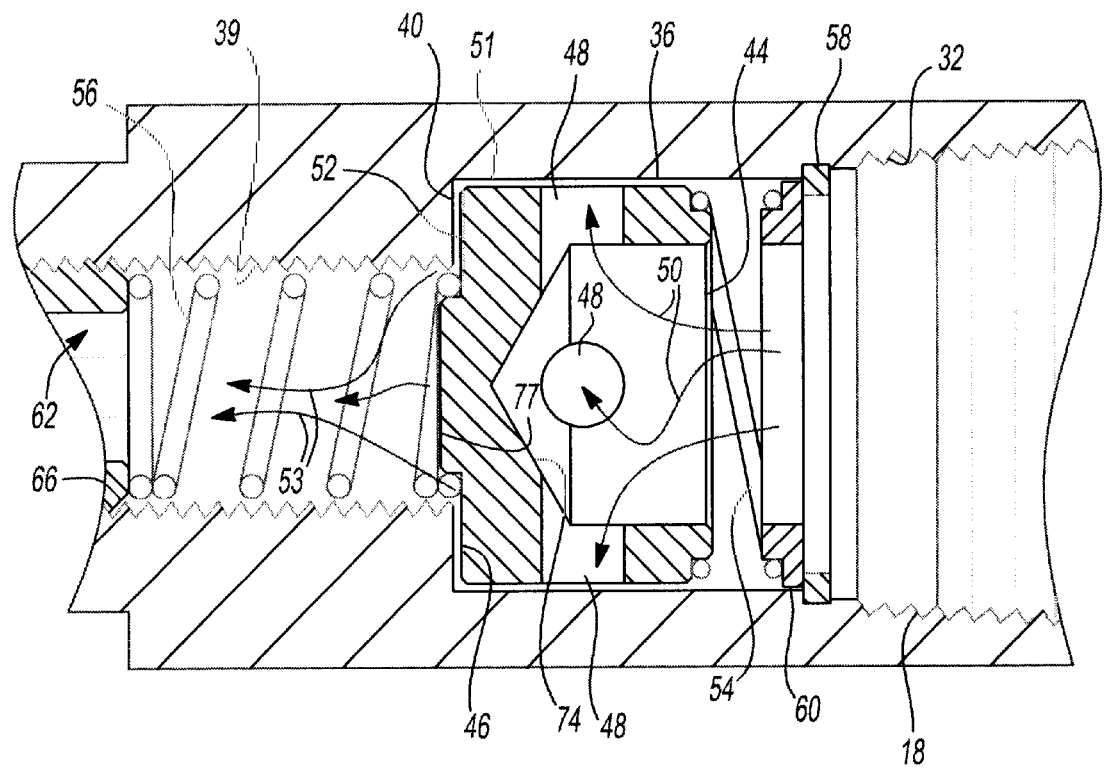
FIG. 4 is an enlarged sectional and cutaway view of the seating member mounted within the tubular housing in an opened position permitting fluid flow therethrough.

Referring now to FIGS. 1 and 2, a flow shut off valve is illustrated at 10 according to the present invention. As previously explained, the valve acts to substantially shut off the fluid flow upon the occurrence of an opened and unregulated fluid flow exceeding a maximum flow rating permitted by the valve. The shut off valve of the present invention is further a significant improvement over the prior art in that it is particularly directed to actuating in response to a determined fluid flow (typically measured in cubic feet per minute "CFM") rather than a determined fluid pressure (pounds per square inch "PSI"), it having been found that large and unregulated fluid flow output, even in the absence of significantly high pressure, can still pose significant danger to both users and other individuals in proximity to the fluid application and for which a suitably constructed shut off valve is required.

A pressurized fluid source, such as an air supply 12, provides a source of fluid according to a regulated pressure and rate of flow. While it is known in the preferred embodiment to incorporate a pneumatically driven source of pressurized fluid, it is also well understood that the shut off valve 10 of the present invention is equally suited for use with hydraulic and other suitable pressurized fluid sources. Referring back to the preferred application, the air supply 12 may further be conventionally provided as an air compressor and, although not shown, it is further understood that additional components such as an evaporator/condenser and air pressure regulator are provided as are known in the art and in order to provide the desired pressurized fluid input.

A fluid supply outlet 14 is typically in the form of a pipe nipple or other suitable outlet and extends from the fluid supply, such as through a pipe or other suitable conduit, and along which are again situated the evaporator/condenser and pressure regulator. The fluid supply outlet 14 may further include a rotatable attachment nut 16 from which extends an exteriorly threaded coupling 18.

Also provided is a further length of conduit 20 (typically a heavy duty and flexible rubberized hose) and which also includes a rotatable attachment nut 22 and a further exteriorly threaded coupling 24. As will be further described in more detail, the threaded couplings 18 and 24 (of the fluid supply 14 and conduit 20, respectively) interengage associated inlet 26 and outlet 28 ends of the valve 10 and so that the valve is interposed therebetween. Also provided at a remote end of the extending conduit 20 is a suitable and conventionally known tool 30, such as an air driven power tool, and which is configured to operate upon the fluid supply delivering a flow of pressurized fluid in a desired and regulated fashion. Such air driven power tools include air hammers, wrenches, drills and the like, although it is also known that other suitable and hydraulic/fluid driven tools, such as paint sprayers and water drain tile cleaning tools can be employed with the valve of the present invention. It is also contemplated that the valve of the present invention can be used in other suitable applications where a tool 30 of some sort is not required, these perhaps including high pressure oil and gas line applications, as well as any other such situation or application where it is necessary to address the risk and possibility of large and unregulated fluid flow.

Referring again to FIG. 1, and also to FIG. 2, the flow shut off valve 10 is constructed of a heavy-duty and generally elongate and cylindrical shaped housing extending from the inlet end 26 to the outlet end 28. In the preferred embodiment, the housing is constructed of a steel or other suitable metal, however it is also understood that other suitable materials, such as plastics, nylons or other hybrid synthetics can be utilized, provided they exhibit the necessary properties of strength and resiliency. It is further contemplated that a portion of the axially extending length of the housing may be constructed with a hexagonal configuration, see at 31, and for the purpose of facilitating tightening of the valve 10 between the attachment nuts, 16 and 22, such as with a pipe wrench (not shown). It is further envisioned that the hexagonal exterior configuration 31 can extend the entire axial length of the elongate housing.

The housing includes an axially extending interior and which, at the inlet end 26, is further defined by a first plurality of interiorly arrayed and annular threads 32 for rotatably and threadably engaging the exteriorly threaded coupling 18 of the pressurized fluid supply. A further plurality of interiorly arrayed and annular threads 34 are provided proximate the outlet end 28 and are likewise engaged by the further exteriorly threaded coupling 24 of the flexible conduit 20. A generally intermediate and communicating location of the axially extending housing interior is further defined by an enlarged diameter portion 36 (located proximate the inlet end 26) and a narrowed diameter portion 38 (located proximate the outlet end 28). The inner facing and annular wall defining the narrowed diameter portion is also threaded, at 39. Separating the enlarged 36 and narrowed 38 diameter portions of the axially extending interior is an annular shoulder 40 (preferably located at a substantially midpoint of the housing interior).

A seating member 42 is provided and includes a substantially cylindrical shaped body capable of permitting the seating member 42 to be axially installed within the valve housing interior and from the inlet end 26. The seating member 42 includes a substantially centrally disposed aperture 44 defined in an inlet surface facing in the direction of the inlet end 26 of the valve housing 10. The aperture 44 is also illustrated by phantom designation in the exploded view of FIG. 2 as well as in the side cutaway profiles of FIGS. 1, 4 and 5. The seating member 42 further includes a closed face 46 at a corresponding outlet side. A plurality of additional apertures 48 (four being illustrated in the depicted embodiment) are defined in annular spaced fashion around a circumference of the cylindrical shaped body.

The apertures 48 communicate the inlet end 26 of the valve housing with the outlet end 28 in a first open position defined by the illustration of FIG. 4. In the open position, the pressurized and regulated inlet fluid (air, water, etc.) is represented by currents 50 which pass through the centrally disposed inlet aperture 44 of the seating member 42, out through the circumferentially arrayed apertures 48, and then through a first outer circumferential passageway 51 (defined by a spacing between the outer cylindrical wall of the seating member 42 and the inwardly facing and enlarged diameter portion 36 of the axially extending valve housing interior) and a further radially directed passageway 52 established between the end face 46 and the annular shoulder 40 separating the enlarged 36 and narrowed 38 diameter portions. The pressurized flow currents are again represented at 53 at the end of this circuitous passage and prior to being expelled from the outlet end 28 of the valve housing.

Referring back to FIGS. 1 and 2, a first coil spring 54 biases the seating member 42 at the inlet side and a second coil spring 56 counter biases the seating member 42 at the outlet side. In the open position previously defined in FIG. 4, the force provided by the second biasing spring 56 equalizes a combined force provided by the first biasing spring 54 and the normally regulated fluid flow (currents 50 in FIG. 4) which act upon the inner surfaces of the seating member 42 before passing through the outer/circumferentially directed apertures 48. It is also contemplated that, apart from coil springs, other suitable types of biasing structure can theoretically be employed to bias the seating member 42 in the open position and without departing from the scope of the invention.

Figure 5:
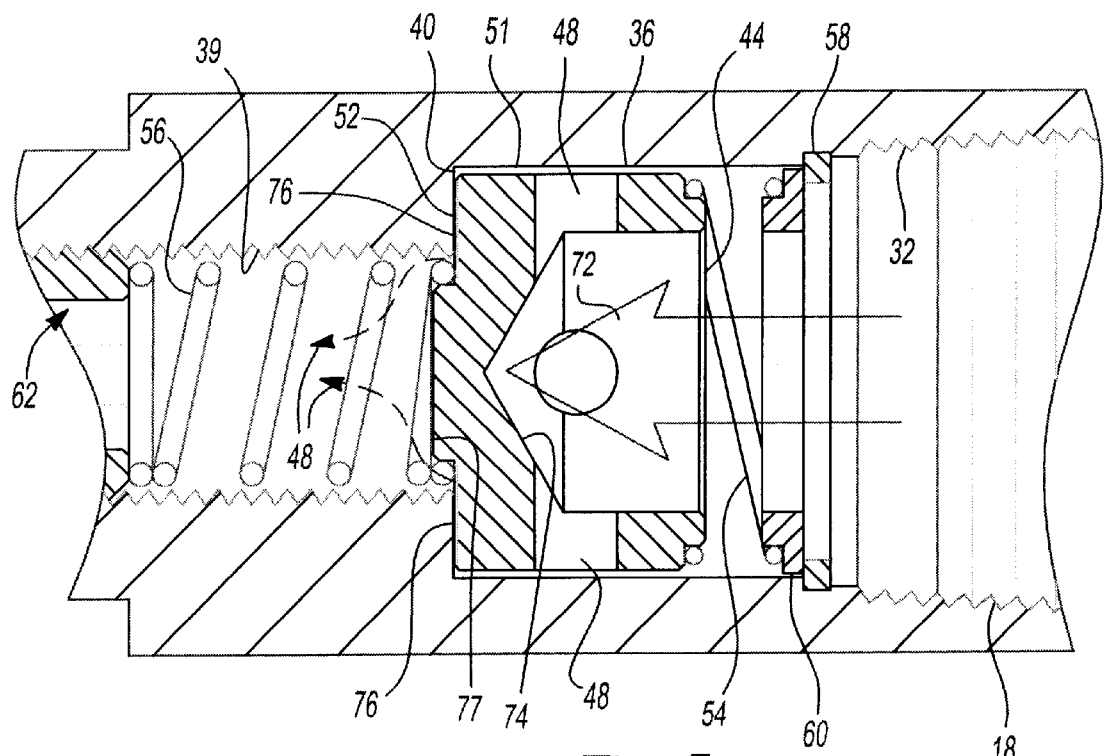
FIG. 5 is a view similar to that illustrating in FIG. 4 and further showing the seating member axially displaced to closed position in which the seating member abuts against the annular shoulder within the valve housing.

The first spring 54 is typically a fixed spring which is held in place by a snap ring 58 and a spring retainer 60 sandwiched between the first coil spring 54 and an opposing and abutting end face of the first threaded coupling 18. Upon engaging the coupling 18, such as by rotating the attachment nut 16, the first spring 54 exerts a fixed biasing force against the inlet side of the seating member 42. Opposing annular surfaces on the spring retainer 60 and the inlet side of the seating member 42 are further configured to engage opposite ends of the coiled spring 54 (as best illustrated in FIGS. 4 and 5) and to maintain the integrity of the unit as it is axially loaded into the valve housing interior. The first spring 54 is also typically rated at a lower recoil force than the second spring 56, by virtue of the fact that the second spring 56 must overcome the combined forces of the first spring 54 and the inlet fluid pressure 50 in order to maintain the seating member 42 in the open position.

The degree of biasing force exerted by the second spring 56 is further capable of being adjusted at the outlet side of the seating member in order to rate or calibrate the valve to a selected flow rate and in which the seating member 42 will only close if that flow rate is exceeded, such as by the inlet fluid source converting from the regulated to an open/unregulated condition. Adjustability of the second spring 56 includes the provision of an insert sleeve 62, the sleeve including an axially extending interior passageway 64 and a plurality of exteriorly placed and spiraling threads 66. An outlet side of the sleeve passageway 64 is provided with a suitable tool receiving configuration (such as in the shape of a hex head screw receiving end 68 in FIG. 2).

The adjustment sleeve 62 is threadably engaged within the narrowed diameter portion 38 of the extending interior and by virtue of its exteriorly placed threads 66 interengaging with the corresponding interiorly placed threads 39 configured within the annular wall defining the narrowed diameter portion 38. The sleeve 62 is then adjusted in first and second axial directions (see bi-directional arrow 70 in FIG. 1) to increase or decrease the compressive force exerted on the spring 56 and, accordingly, to selectively increase and decrease the bias exerted by the spring 56 against the seating member 42 in counteracting fashion to the forces of the first spring 54 and regulated fluid flow 50. The adjustment sleeve 62 further includes a shoulder 69 which is spaced a determined distance from an opposing shoulder 71 defined within the housing. The distance between the shoulders 69 and 71 is dependent upon the rotation of the sleeve 62 (threads 66) via the housing (threads 39) and defines the counteracting spring forces exerted by second spring 56.

Referring further to FIG. 5, the seating member 42 is illustrated in a closed position and in which the pressurized fluid flow is substantially interrupted. This again results from the combined biasing forces of the first spring 54 and the inlet side fluid pressure, now identified by directional arrow 72, exceeding the counteracting biasing forces of the second spring 56. The creation of the fluid pressure force 72 typically results from a failure in the regulation of the fluid supply 12 (such as resulting from a failure in the pressure regulator or other component of the fluid supply) and which results in a dramatic increase in the flow rate of the fluid supply. At this point, the flow 72 of the fluid exceeds what can be exhausted in regulated fashion through the annular apertures 48 and passageways 51 and 52. The flow 72 consequently impacts against an interior annular wall of the seating member 42 (defined by conically tapered interior surface 74), increasing the combined inlet side biasing force to the point at which it overcomes the counteracting force of the second spring 56, and at which point the seating member 42 axially translates until its closed face 56 abuts against the annular shoulder 40 defined in the valve housing interior.

Even at the point in which the seating member 42 is translated to the substantially interrupted position, it is desirable (in certain applications) to maintain some fluid pressure in the conduit 20, such as to provide for quick return time to the task being performed and once the fluid supply 12 is returned to its regulated condition, and without otherwise defeating the purpose of the flow valve shut off assembly, that being to prevent excessive degrees of fluid flow (CFM) through the outlet conduit 20. To this end, a plurality of radially extending notches 76 are defined within the face 46 of said seating member 42 (and between an outer annular edge and an inner projecting edge 77 of the closed end face 46) corresponding with the outlet side of the seating member 42. Upon actuation of the seating member 42 to the substantially closed position (see again FIG. 5), a reduced volume of fluid flow is permitted across the inlet side, through the circumferential apertures 48, the passageway 51, through the area of each notch 76 recessed beyond the abutting shoulder 40, and across the outlet side of the seating member (defined by additional flow arrows 78) and into the interconnected and extending conduit 20.

It is therefore evident that the flow shut off valve of the present invention is a novel and marked improvement over prior art check valves and like, particularly in that the present invention provides a reliable and durable valve construction for ensuring substantial interruption of an unregulated/open fluid flow from a fluid supply. The further provision of biasing springs on both sides of an axially translatable seating member, and as opposed to only a single spring on the outlet side, provides a greater degree of biasing adjustment and control and is particularly suited to deal with the condition of large unregulated fluid flows (as opposed to only detecting higher pressures).

Having described our invention, additional preferred embodiments will become apparent to those skilled in the art to which it pertains and without deviating from the scope of the appended claims.

We claim:

1. A flow shut off valve for use with a pressurized fluid application, the fluid application including a normally regulated and pressurized fluid supply, a length of a conduit extending from the fluid supply, said valve further comprising:
   a housing interposed-between the fluid supply and the extending conduit, said housing having an inlet end communicating with an outlet of said fluid supply, said housing further having an outlet end communicating with an inlet of the length of conduit, said housing further including an axially extending interior extending between said inlet end and said outlet end, said axially extending interior defining, at an intermediate location, an annular shoulder separating an enlarged diameter portion of said interior with a narrowed diameter portion;
   a seating member slidably mounted within said enlarged diameter portion and which is axially translatable over a selected distance defining an open position permitting fluid flow through said interior and a closed position in which said seating member abuts against said annular shoulder, substantially interrupting said fluid flow;
   a first biasing means comprising a fixed spring exerted against an inlet side of said seating member and a second biasing means comprising an adjustable spring exerted against an outlet side of said seating member, said adjustable spring exerting a force towards said inlet end equalizing a combined force provided by said fixed spring and the normally regulated fluid supply in said open position;
   an insert sleeve inserted within said outlet end of said housing and threadably engaged within said narrowed diameter portion of said extending interior, said sleeve being adjusted in first and second axial directions to selectively increase and decrease said bias exerted against said outlet side of said seating member; and
   upon the fluid application switching from a normally regulated condition to an opened and unregulated condition, said combined force acting upon said seating member, overcoming said adjustable spring, and actuating said seating member in a direction only towards said outlet end to said closed position.

2. The flow shut off valve as described in claim 1, further comprising preservation means for maintaining the conduit in an inflated position upon said seating member actuating to said closed position.

3. The flow shut off valve as described in claim 2, said preservation means further comprising a plurality of radially extending notches defined within a face of said seating member and corresponding with said outlet side, a reduced volume of fluid flow being permitted from said inlet side, through said notches, and across said outlet side and into said extending conduit.

4. The flow shut off valve as described in claim 1, said seating member further comprising a substantially cylindrical shaped body with a substantially centrally disposed aperture facing said inlet end, a plurality of additional apertures being defined in annular spaced fashion around a circumference of said cylindrical shaped body and communicating said inlet end with said outlet end in said open position.

5. The flow shut off valve as described in claim 4, said seating member further comprising a closed end face at said outlet side.

6. The flow shut off valve as described in claim 1, a first exteriorly threaded coupling extending from the fluid supply and threadably engaging with associated threads placed upon said axially extending interior at said inlet end, a second exteriorly threaded coupling extending from said conduit and threadably engaging with additional threads placed upon said axially extending interior at said outlet end.

7. The flow shut off valve as described in claim 6, further comprising a snap ring and a spring retainer sandwiched between said first coil spring and an end face defined by said first threaded coupling.

8. A flow shut off valve for use with a pressurized fluid application, the fluid application including a normally regulated and pressurized fluid supply, a length of conduit extending from the fluid supply, said valve further comprising:
   an elongated and substantially cylindrical shaped housing interposed between the fluid supply and the extending conduit, said housing having an inlet end communicating with a first coupling extending from an outlet of said fluid supply, said housing further having an outlet end communicating with a second coupling extending from an inlet of the length of conduit, said housing further including an axially extending interior extending between said inlet end and said outlet end:
   a seating member slidably mounted within said axially extending interior and which is translated over a selected distance defining an open position permitting fluid flow through said interior and a closed position in which said seating member abuts against said annular shoulder, substantially interrupting said fluid flow, said seating member having a substantially cylindrical shaped body with a substantially centrally disposed aperture facing said inlet end, a plurality of additional apertures being defined in annular spaced fashion around a circumference of said cylindrical shaped body and communicating said inlet end with said outlet end in said open position, said seating member further comprising a closed end face at said outlet side;

a first and fixed biasing spring exerting against an inlet side of said seating member and a second and adjustable biasing spring exerting against an outlet side of said seating member, said second spring exerting a force towards said inlet end equalizing a combined force provide by said first spring and the normally regulated fluid supply in said open position; and upon the fluid application switching from a normally regulated condition to an opened and unregulated condition, said combined force acting upon said seating member, overcoming said second biasing spring, and actuating said seating member in a direction only towards said outlet end to said closed position.

9. A flow shut off valve for use with a pressurized fluid application, the fluid application including a normally regulated and pressurized fluid supply, a length of a conduit extending from the fluid supply, said valve further comprising:

a housing interposed between the fluid supply and the extending conduit, said housing further including an axially extending interior defining, at an intermediate location, an annular shoulder separating an enlarged diameter portion of said interior with a narrowed diameter portion;

a seating member slidably mounted within said enlarged diameter portion and which is axially translatable over a selected distance defining an open position permitting fluid flow through said interior and a closed position in which said seating member abuts against said annular should, substantially interrupting said fluid flow;

a first biasing means comprising a fixed spring exerted against an inlet side of said seating member and a second and adjustable biasing means comprising an adjustable spring exerted against an outlet side of said seating member, said second biasing means exerting a force towards said inlet end equalizing a combined force provided by said first biasing means and the normally regulated fluid supply in said open position; and upon the fluid application switching from a normally regulated condition to an opened and unregulated condition, said combined force acting upon said seating member, overcoming said second biasing means, and actuating said seating member in a direction only towards said outlet end to said closed position.

* * * * *